Figure 1:
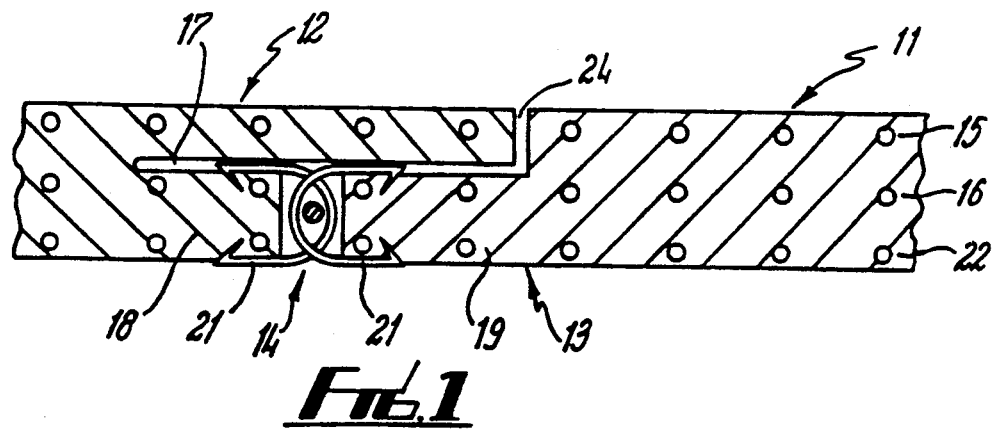

United States Patent [19]
Wasylezuck et al.

[11] Patent Number: 5,217,415
[45] Date of Patent: Jun. 8, 1993

[54] PAPERMAKERS AND LIKE FABRICS

[75] Inventors: Michel Wasylezuck; Jean Rouhling, both of Montbron, France

[73] Assignee: Scapa Group plc, Blackburn, United Kingdom

[21] Appl. No.: 752,633

[22] PCT Filed: Mar. 5, 1990

[86] PCT No.: PCT/GB90/00332
§ 371 Date: Aug. 29, 1991
§ 102(e) Date: Aug. 29, 1991

[87] PCT Pub. No.: WO90/10165
PCT Pub. Date: Sep. 7, 1990

[30] Foreign Application Priority Data
Mar. 4, 1989 [GB] United Kingdom ............. 8905005

[51] Int. Cl.[5] .......................................... F16G 3/00
[52] U.S. Cl. ................................... 474/256; 474/254
[58] Field of Search ............................ 474/253-256

[56] References Cited

U.S. PATENT DOCUMENTS

| | | | |
|---|---|---|---|
| 2,733,181 | 1/1956 | Riedesel | 474/254 X |
| 3,546,054 | 12/1970 | Ross | 474/254 |
| 4,279,676 | 7/1981 | Morrison et al. | 474/254 X |

FOREIGN PATENT DOCUMENTS

| | | |
|---|---|---|
| 2102478 | 10/1972 | Fed. Rep. of Germany . |
| 1575375 | 7/1969 | France . |
| 2116609 | 7/1972 | France . |
| 373421 | 2/1975 | Sweden . |

*Primary Examiner*—Thuy M. Bui
*Attorney, Agent, or Firm*—Keck, Mahin & Cate

[57] ABSTRACT

A papermakers fabric, and particularly a corrugator fabric, has a flat-woven, multilayer structure and is brought into endless form by a joint or seam arranged obliquely relative to the running direction of the fabric and at the roller side thereof. The angular disposition of the seam reduces noise levels, sheet marking and web breakage.

5 Claims, 1 Drawing Sheet

PAPERMAKERS AND LIKE FABRICS

The invention concerns papermakers and like fabrics, and has more particular reference to corrugator belts.

Traditionally corrugator belts are of substantial thickness, and, in view of such thickness, difficulty has been experienced in bringing such belts into endless form.

In our copending United Kingdom Patent Application No. 8825870.2 we have disclosed a flat-woven papermakers or like industrial fabric comprising plural layers of interwoven warp and weft yarns and binder yarns connecting said plural layers and have proposed a particular form of seam wherein a butt joint is provided which overlies a clipper seam, the purpose being to give an improved paper or like support surface to the fabric in the region of the seam.

The present invention is concerned with the opposite face of the fabric, and is more particularly directed to a reduction in the noise generated by passage of the seam over a support roller and in the marking attributable to seam/roller interaction.

According to the invention there is proposed a low noise papermakers or like industrial fabric having an oblique seam joining the respective free ends thereof, characterised in that the seam lies at an angle in the range 1° to 15° with respect to a line transversely of the fabric and perpendicular to the running direction thereof.

According to a preferred feature, the angle of inclination lies in the range 3° to 8°.

Figure 2:
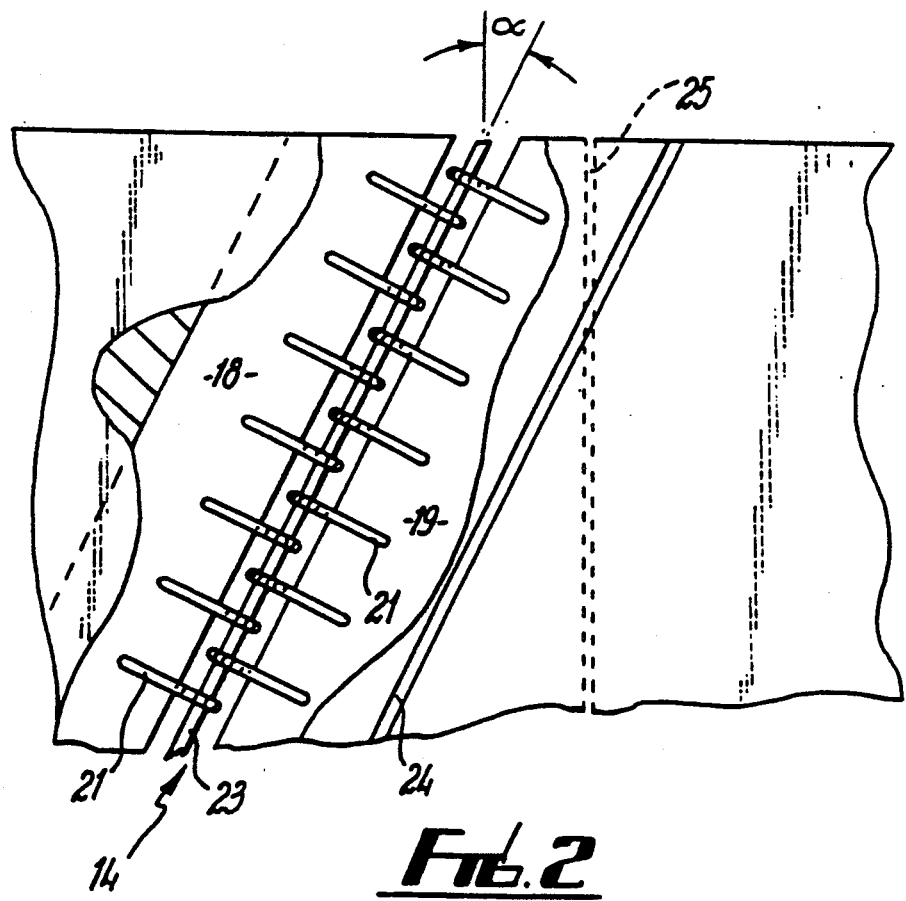

The invention will now be described further, by way of example only, with reference to the accompanying diagrammatic drawings illustrating one embodiment thereof, and in which:

FIG. 1 illustrates the connection between the fabric ends of a woven multi-layer structure; and FIG. 2 is a plan view, partly broken away, of the arrangement shown in FIG. 1.

Referring now to the drawings, and particularly to FIG. 1 thereof, a corrugator belt comprises a multi-layer structure 11 of integral, flat-woven form, in which the respective ends 12, 13 only are shown, the structure being made endless by means of a clipper seam 14 engaged with some only of the layers.

In forming the joint between the fabric ends, the respective ends 12, 13 are cut to complementary stepped form, those cuts at the respective fabric ends 12, 13 which extend parallel to the general plane of the fabric being on a line between two adjacent layers 15, 16, the cut thus severing only yarns which connect the adjacent layers and thereby avoids prejudice to the integrity of the individual layers. The cut at fabric end 12 which is parallel to the general plane of the fabric is extended into the fabric as at 17, the clipper seam 14 being applied between the tongue 18 formed by the extension 17 to such cut and the corresponding part 19 of the opposed fabric end 13.

As is apparent from the drawing, the upper layer 15 of fabric end 12 extends across the clipper seam 14 and overlies layers 16 and 22 at opposing fabric end 13.

In accordance with the present invention, the fabric ends 12, 13 are cut on the bias, at least as regards the extremity of tongue 18 and the corresponding opposing part 19, the clipper seam following the line of such ends. The preferred angle of inclination is 3° with respect to the line of a conventional seam, although other inclinations, say within the range 1° to 15° and preferably between 3° and 8° may be used.

As is shown in FIG. 2, the individual clipper hooks 21 of the clipper seam will be positioned to extend outwardly from the respective fabric ends at right angles thereto, and will thus be inclined at a like angle to the machine direction yarns at the fabric ends, although it is to be understood that such hooks may, if preferred, lie parallel to the machine direction yarns, thus facilitating the interdigitation of the hooks on insertion of the pintle wire 23. Whilst it is envisaged that the hooks will be separate one from another, it may be found convenient to provide a means whereby the same are secured together, such means serving to maintain the hooks in a position at right angles to the line of the seam.

The cut in the upper fabric layer may be parallel to the line of the seam, as shown at 24 in solid line, but spaced therefrom, or may be at right angles to the machine direction yarns as shown in dotted line at 25. In the latter case the relationship between the bias angle $a$ and the line of cut in the upper fabric layer will be such that the line of cut in question does not overlie the seam.

In use in passing over a support roller, any relative displacement between the roller and belt will be localised, and will move progressively from one edge of the fabric to the other, the effect on loading of the roller consequent upon passage of the seam in contact therewith likewise varying cyclically as the region of contact moves across the fabric.

We have found that by utilising a seam of the form herein proposed we are able to provide an arrangement which is quieter in operation than conventional arrangements and which gives rise to a lesser incidence of marking than has hitherto been the case.

The following results were obtained for the noise levels generated at the top belt of a Martin Corrugator operating at the speeds indicated:

| I Conventional seam extending at 90° to the fabric edge | | | |
|---|---|---|---|
| 1. Fabric: | BRICQ 398507 | | |
| 2. Machine Speed: | 125 meters/min. | | |
| 3. Noise Levels: | | | |
| Measuring Location | Average Noise Level | Maximum Noise Level | Period of Measurement |
| Point of Entry | 83 | 87 | 35 |
| Tension Roller | 81 | 83 | 34 |
| Middle of Table | 83 | 87 | 35 |
| Glue Applicator Cylinder | 83 | 85 | 35 |
| 5 cm above drive roller | 80 | 84 | 35 |
| Average | 82 | 85.2 | |
| 4. Marking: | Slight | | |
| 5. Board Type: | Micro Corrugations | | |
| II Oblique seam inclined at 87° to the fabric edge | | | |
| 1. Fabric: | BRICQ 100099 | | |
| 2. Machine Speed: | 109 meters/min. | | |
| 3. Noise Levels: | | | |
| Measuring Location | Average Noise Level | Maximum Noise Level | Period of Measurement |
| Point of Entry | 81 | 83 | 39 |
| Tension Roller | 79 | 80 | 40 |
| Middle of Table | 81 | 81 | 40 |
| Glue Applicator Cylinder | 80 | 81 | 39 |
| 5 cm above drive roller | 78 | 79 | 37 |
| Average | 79.8 | 80.8 | |
| 4. Marking: | None | | |
| 5. Board Type: | Large Corrugations | | |

As can be seen, the noise levels generated by the fabric having the oblique seam were reduced as compared with those of the conventional seam, whilst the spread between the average and maximum noise levels was materially less in the case of the oblique seam fabric. Since noise levels are measured on a logarithmic scale the reduction is of significant proportions.

No distortion of the results is thought to arise from the different board quality in the two cases.

It is recognised that in the case of Test II the machine speed is at a lower level, the reduction being consequent upon the processing of a board of a different grade. However, subsequent qualitative testing shows that, whereas noise levels increase with increasing machine speed in the case of conventional seams, this is not so with the oblique seam of the invention or if indeed there is an increase with machine speed the extent of that increase is markedly less.

Experience has shown there to be a further benefit from the oblique seam of the invention, namely that the creation of anomolies in the corrugated web is reduced. When the joint is normal to the running direction of the belt, the bumping associated with the rolls "dropping" into the seam often causes sheet rupture, the problem being alleviated by the seam proposed by the invention.

Furthermore, the absence of bumping is expected to result in a reduction in wear and damage to the rollers and their bearings.

It is to be understood that, although the invention is disclosed in the context of the form of seam disclosed in our copending United Kingdom Patent Application No. 8825870.2, the invention is of use in relation to other forms of seam, whether or not such seams embody a cover flap of some form.

Furthermore, the invention may be used in relation to single- or multi-layer fabrics of woven or other form. For example, an inclined seam of the kind proposed is of application to the context of needle-punched or coated fabrics, whether such fabrics include a reinforcement of woven form or not.

We claim:

1. A low noise papermakers or like industrial fabric having an oblique seam joining respective free ends thereof, characterised in that the seam lies at a minimum angle of 1° and a maximum angle of 15° with respect to a line extending transversely of the fabric and perpendicular to the running direction thereof.

2. A papermakers or like fabric as claimed in claim 1, wherein the angle of inclination lies in the range 3° to 8°.

3. A papermakers or like industrial fabric as claimed in claim 1, wherein the jointing means comprises a clipper seam, the hooks of said seam being arranged at right angles to the line of the seam formed by the jointing means.

4. A papermakers or like industrial fabric as claimed in claim 1 comprising a multi-layer structure, the ends of the fabric being of complementary stepped configuration and providing a flap which overlies the line of joint throughout the full fabric width, the jointing means being secured to and connecting the fabric layers underlying the flap.

5. A papermakers or like industrial fabric as claimed in claim 4, wherein the end of the flap and the corresponding part of the opposed fabric end define a butt joint parallel to the jointing means.

* * * * *